United States Patent [19]

Tamura

[11] Patent Number: 4,566,043
[45] Date of Patent: Jan. 21, 1986

[54] LASER RECORDING APPARATUS

[75] Inventor: Yasuyuki Tamura, Kawasaki, Japan

[73] Assignee: Canon Kabushiki Kaisha, Tokyo, Japan

[21] Appl. No.: 670,131

[22] Filed: Nov. 9, 1984

Related U.S. Application Data

[60] Continuation of Ser. No. 359,029, Mar. 17, 1982, abandoned, which is a division of Ser. No. 201,538, Oct. 28, 1980, abandoned.

[30] Foreign Application Priority Data

Nov. 5, 1979 [JP] Japan .................................. 54-142939

[51] Int. Cl.[4] ........................ H01N 1/30; G01D 15/14
[52] U.S. Cl. .................................... 358/300; 346/108; 346/160
[58] Field of Search ...................... 346/76 L, 108, 160; 358/300, 296, 302, 280; 369/121, 122

[56] References Cited

U.S. PATENT DOCUMENTS

| | | | |
|---|---|---|---|
| 3,541,245 | 11/1970 | Wilby | 358/280 |
| 4,012,584 | 3/1977 | Gascoigne | 358/302 |
| 4,053,898 | 10/1977 | Hirayama et al. | 346/108 |
| 4,231,048 | 10/1980 | Horike et al. | 346/140 R |
| 4,253,102 | 2/1981 | Kataoka et al. | 346/108 |
| 4,393,387 | 7/1983 | Kitamura | 346/108 |

Primary Examiner—Thomas H. Tarcza
Attorney, Agent, or Firm—Fitzpatrick, Cella, Harper & Scinto

[57] ABSTRACT

A laser recording apparatus for recording information on a recording medium by modulated beams of laser, having a semiconductor laser array having a plurality of laser-radiating sources, primary scanner for moving laser beams in a primary scanning direction, and a device for moving the recording medium in a secondary scanning direction which is substantially perpendicular to the primary scanning direction, the laser beams radiated from the laser-radiating sources of the semiconductor laser array being maintained on the recording medium at their positions which are spaced away from one another in the primary scanning direction and shifted from one another by integral times the distance between the adjacent scanning lines in the secondary scanning direction.

4 Claims, 3 Drawing Figures

LASER RECORDING APPARATUS

This application is a continuation of application Ser. No. 359,029 filed Mar. 17, 1982, now abandoned, which in turn is a division of patent application Ser. No. 201,538, filed Oct. 28, 1980, abandoned.

BACKGROUND OF THE INVENTION

1. Field of the Invention

This invention relates to a laser recording apparatus for effecting recording on a recording medium by use of an array of semiconductor lasers.

2. Description of the Prior Art

There has been proposed and broadly utilized a laser recording apparatus of such a type that an endless recording medium such as a photoreceptor or the like is movably supported and scanned by a beam of laser light in a primary direction substantially perpendicular to the moving direction of the recording medium to effect an image-formation.

The scanning of the laser in the primary direction is accomplished by use of a vibrating mirror or a rotating multifaceted mirror as scanning means. In order to increase the recording operation in velocity, such scanning means must be driven at higher velocity. In any event, however, the increase of scanning in velocity is limited. Even if the multifaceted mirror which can be rotated at high speed is utilized, it is difficult to maintain the rotation thereof at a velocity in the order of 20,000 r.p.m. in a stable manner because there are various problems with respect to bearing technique and the like.

In order to overcome these problems, an AO modulator for large-sized laser such as He-Ne laser or the like has been broadly used to divide the beam of the laser. In such a proposal, however, a laser recording apparatus cannot be decreased in size because the laser source and AO modulator are large.

On the other hand, there has been developed a semiconductor element which can be used as a source of laser beam. If such a semiconductor element is used as a single source of laser beam, AO modulator which is inconvenient for decreasing the laser recording apparatus in size must be utilized. There has been also developed an array of semiconductor lasers for providing multiple sources of laser beam. In such a proposal, it is difficult to position these sources of laser beam with a distance from one to another which is less than about 100µ because there are problems with respect to heat generation in sources of laser beam, manufacturing accuracy and the like. In an optical system for scanning which utilizes such sources of laser beam, light spots are extremely spaced from each other on the recording medium so that it will be almost unable to record.

SUMMARY OF THE INVENTION

It is an object of this invention to provide novel and superior laser recording apparatus.

Another object of this invention is to provide a laser recording apparatus in which a recording operation can be effected at higher speed.

This invention provides a laser-beam recording apparatus for recording information on a recording medium by use of modulated beams of laser light, characterized by an array of semiconductor lasers having a plurality of laser-radiating points, primary scan means for effecting the scanning of laser beams in a primary scan direction, image formation means for image-forming said laser beams on a recording medium and means for moving said recording medium in a secondary scan direction substantially perpendicular to said primary scan direction of said laser beams, the laser beams radiated from the laser-radiating points of said semiconductor laser array being maintained on said recording medium at their positions which are spaced from one another in said primary scan direction and shifted from one another by integral times the distance between the adjacent scanning lines in said secondary scan direction.

Other objects and features of this invention will now appear from reading the following detailed description of a preferred embodiment which is illustrated in the accompanying drawings.

DESCRIPTION OF THE PREFERRED EMBODIMENT

Figure 1:
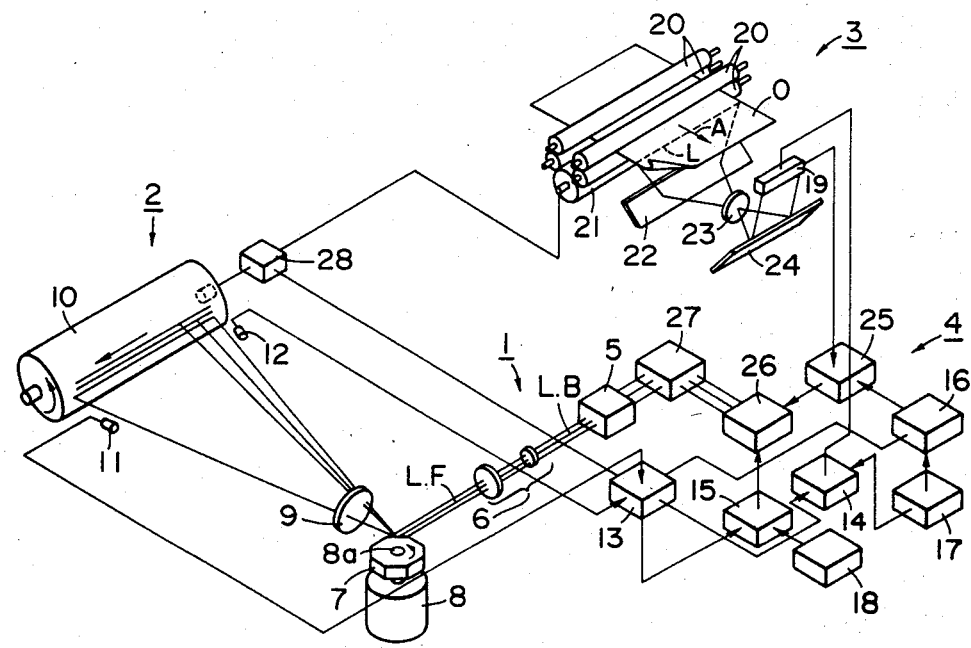
FIG. 1 is a diagram of a laser recording apparatus which is an embodiment of this invention.

In FIG. 1, a laser recording apparatus comprises a laser scanning mechanism 1 for scanning the surface of a recording medium by beams of laser light from sources which are modulated in accordance with information signals to be recorded and an image recording mechanism 2 which, in the illustrated embodiment, includes a photoreceptive drum as a recording medium exposed by the scanning laser beams to record an image thereon in accordance with an electrophotographic process. Around the drum is located any well-known electrophotographic means (not shown). The apparatus also includes an original-reading mechanism 3 for converting optical information from the original into time series signals by use of photoelectric conversion elements as described hereinafter, and a controlling mechanism 4 for controlling the laser scanning mechanism, the image recording mechanism and the original reading mechanism in a cooperative relationship therebetween.

FIG. 1 shows an array of semiconductor lasers 5 having plural sources of light (three in the illustrated embodiment); beam expander 6; a rotating multi-faceted mirror 7; a drive motor 8 for the multifaceted mirror; a f-θ lens system 9; a photoreceptive drum 10; photodetectors 11 and 12; a step controller 13; a first clock gate 14; a second clock gate 15; a comparison signal generator 16; a first clock generator 17; a second clock generator 18; a solid image sensor 19; original-transferring rollers 20; a driving roller 21 for the rollers 20; reflectors 22 and 24; a lens system 23 for forming images; a comparator 25; a memory 26; a laser controller 27; and a controller 28 for controlling the movement of the drum 10.

Each of laser beams LB radiated from the semiconductor laser array 5 responsive to information signals is expanded into a laser flux LF having a predetermined cross-sectional area by means of the beam expander 6. Each laser flux LF impinges upon the rotating multifaceted mirror 7 and is reflected toward the F-θ lens system 9. This rotating multifaceted mirror 7 is a regular polygonal column having peripheral faces of reflective material, which column is fixedly mounted on the rotating shaft 8a of the drive motor 8 so that, upon operation, the column can be rotated by the drive motor at a predetermined angular velocity in a direction as shown by an arrow. The rotation of the mirror 7 causes the incidence angle of each laser flux LF to change successively at the reflective faces of the mirror 7 so that the reflected laser fluxes LF will be periodically deflected in a single plane.

Such reflected beams of light are focused onto the surface of the photoreceptive drum 10 through the f-θ lens system 9. Therefore, the focused points of the laser fluxes LF on the drum 10 will be also moved along straight lines which are primary scan lines for writing, under the deflection of the laser fluxes LF. It is of course that the photoreceptive drum is properly designed in length to correspond to the primary scan lines.

An original O to be recorded is transferred by the original transferring rollers 20 in such a direction as shown by an arrow A, which direction can be called a secondary scan direction.

A primary scan line L is established in the original-transferring plane. This primary scan line L is a straight line wherein the original being moved in the original-transferring plane will be scanned.

The solid image sensor 19 is an integral part wherein a number of extremely small photoreceptive elements are disposed close to one another and aligned with one another in a line, the integral part having a self-scanning function. The solid image sensor 19 includes its photoreceptive area which is faced against the primary scan line L and positioned parallel thereto.

The reflectors 22, 24 and the image-forming lens system 23 are located for forming on said photoreceptive area the image of the original on the primary scan line L in a reduced scale. It is of course that the width of the primary scan line L is determined depending to the resolving power of the above optical system.

When the reduced image of the original on the primary scan line L is projected onto the optical area of the solid image sensor 19, each individual photoreceptive elements generates a photoelectromotive force depending to the quantity of light received therein. The photoelectromotive force is converted into a time series signal in accordance with the arrangement of the photoreceptive elements when drive pulses are applied to the solid image sensor 19 to cause it to perform the self-scanning function thereof. Such a time series signal appears at the output of the solid image sensor 19 as an analog signal and is transferred to the input of the memory 26 after the analog signal has been converted into a digital signal by the comparator 25.

The memory 26 includes a plurality of memory areas corresponding in number to the light sources in the semiconductor laser array. The signals obtained by the scanning of the solid image sensor 19 are successively written in the respective memory areas. When the semiconductor laser array having three sources of light radiation is used as in the illustrated embodiment, the signals are memorized in at least three memory areas corresponding to the respective sources of light radiation in the following manner. For example, when a certain line on the original is scanned by the solid image sensor, the resulting signals are written in the first memory area. When a second line is scanned, the resulting signals are written in the second memory area. When a third line is scanned, the resulting signals are written in the third memory area. When a fourth line on the original is scanned by the solid image sensor, the resulting signals are again memorized in the first memory area so that this procedure will be repeated similarly.

The memory signals written in the respective memory areas are transferred to the laser controller 27 for modulating the sources of light radiation.

In the illustrated embodiment, each mechanism has sufficient time to control since the clock cycle for the scan of the solid image sensor is different from that for transmitting the signals to the laser controller for controlling the beams of laser.

The first clock gate 14 for controlling the reading scan in the solid image sensor 19 is adapted to transfer the clock pulses from the first clock generator 17 to the solid image sensor in response to the start signal from the step controller 13. On the other hand, the second clock gate 15 for controlling the reading scan in the memory 26 is adapted to transfer the clock pulses from the second clock generator 18 to the memory in response to the start signal from the step controller 13.

Thus, the memory signals transferred to the laser controller 27 serves to modulate the respective sources of light radiation in the semiconductor laser array 5. The laser beams LB from the modulated sources of light radiation will be image-formed on the photoreceptor at positions that are spaced away from one another with a relatively large distance.

In this connection, if the focus length from the beam expander 6 to the sources of light is f1, the focus length from the f-θ lens system to the photoreceptor is f2, and the distance between the adjacent sources of light-radiation in the semiconductor laser array is l, the distance d between the image-formation points on the photoreceptor can be represented by a formula: $l \times f2/f1$. Normally, the value f1 is about 8 mm, and the value f2 is in the range of 300–450 mm. The space l between the sources of light-radiation has its lower limit of about 100 mm since there are problems with respect to heat generation, manufacturing technique and the like. Accordingly, if f1 is 8 mm, f2 is 300 mm and l is 100μ, for example, the value d becomes 3.75 mm. It is therefore understood that, when the array of light-radiation sources is oriented along the movement direction of the photoreceptor drum, that is, the secondary scan direction, the distance between the adjacent scanning lines on the drum will be extremely large. As a result, the prior art laser recording apparatus would have increased memory capacities and complicated controls of write timing.

In the laser recording apparatus of this invention, the array of light-radiation sources is inclined to the rotational direction of the photoreceptive drum, that is, the secondary scan direction, so that the adjacent lines on the original can be concurrently written in the drum by the laser beams from the respective sources of light-radiation. Thus, this invention provides an improved laser recording apparatus which can be simply controlled and operated at higher speed with its decreased memory capacity.

Figure 2A:
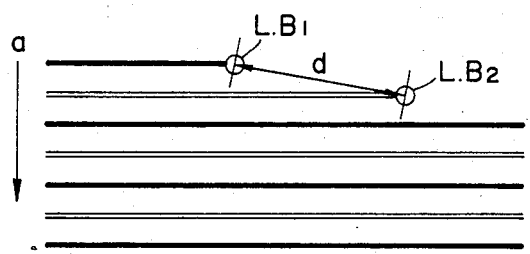
FIG. 2A is an illustrative view of laser beams on a recording medium in the apparatus based on a system of this invention.
Figure 2B:
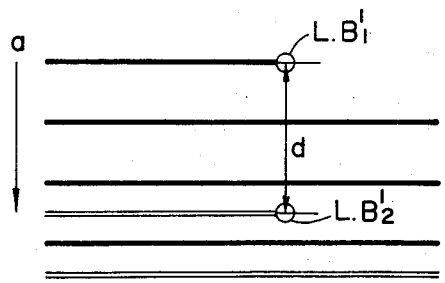
FIG. 2B is an illustrative view of laser beams on a recording medium in the case of the conventional arrangement of laser-radiating sources.

FIG. 2A shows the laser beams on the recording surface of the photoreceptive drum in the apparatus according to this invention. It is understood from this figure that the array of light-radiation source is inclined to the secondary scan direction a so that the distance between the adjacent lines on the recording surface is sufficiently small to correspond to that in the original even if the space d between the adjacent spots LB1, LB2 of laser beams on the same recording surface is relatively large. On the other hand, FIG. 2B shows the laser beams on the recording surface in the prior art laser recording apparatus such as Ne-He laser wherein the laser beam spots LB1', LB2' are disposed in a direction parallel to the secondary scan direction so that these spots will be spaced away from each other with a substantial distance d, leaving several lines therebetween.

This invention overcomes such a disadvantage in the prior art. This can be accomplished as by positioning the light-radiation sources in the semiconductor laser array along such a line that is inclined to the rotating shaft of the multifaceted mirror. In this connection, the distance between the adjacent laser beam spots may be unstable since the laser beams are only slightly different from each other in angle with respect to the lens system. As a result, images can be extremely slightly shifted sometimes in the primary scan direction.

For this reason, it is preferred that the photodetectors 11 and 12 are disposed outside of the image forming area for detecting scan-starting positions of the respective beams of laser to produce signals by which image signals in each line can be modulated. Thus, a perfect recording position can be established for each scanning line. Furthermore, it is not necessary to provide an exclusive detector for each laser beams. The laser beams can be simply detected by a common photodetector. In this case, there must be provided means for counting the signals to distinguish any incident beam from other incident beams.

As be apparent from the foregoing, this invention provides a superior laser recording apparatus having a simple construction in which the recording operation can be effected at higher speed and which utilizes a plurality of laser beams for writing read information with simple controlling mechanisms and a small memory capacity.

What I claim is:

1. A laser recording apparatus for recording information on a recording medium by use of a plurality of modulated laser beams, comprising:
    a photosensitive medium movable in a secondary scanning direction;
    a semiconductor laser array including a plurality of laser-radiating sources for radiating a plurality of laser beams;
    primary scan means for moving said plurality of laser beams in a primary scanning direction which is substantially perpendicular to the secondary scanning direction, said semiconductor laser array being oriented in such a manner that the beams radiated by said plurality of laser-radiating sources are arranged in a line inclined relative to the primary scanning direction and to the secondary scanning direction on said photosensitive medium;
    reading means for reading photoelectrically an original line by line and converting the information carried on the original and represented by each line respectively into time series signals;
    memory means having a plurality of memory areas corresponding to each of said plurality of laser-radiating sources, each of said plurality of the memory areas being operative to memorize the information represented by different ones of the lines of the original; and
    control means for controlling each of said plurality of laser-radiating sources to radiate a laser beam in accordance with information memorized in a respective different one of said plurality of memory areas.

2. A laser recording apparatus according to claim 1 further comprising:
    first clock generator means for controlling said reading means;
    second clock generator means for controlling the reading-out of the information from said memory means in order for said control means to control said laser-radiating sources, the clock pulse period of said first clock generator means being different from the clock pulse period of said second clock generator means.

3. A laser recording system for recording information on a recording medium by use of a plurality of modulated laser beams, comprising:
    a photosensitive medium movable in a secondary scanning direction;
    a semiconductor laser array including a plurality of laser-radiating sources for radiating a plurality of laser beams;
    primary scan means for moving said plurality of laser beams in a primary scanning direction which is substantially perpendicular to the secondary scanning direction, said semiconductor laser array being oriented in such a manner that the beams radiated by said plurality of laser-radiating sources are arranged in a line inclined relative to the primary scanning direction and to the secondary scanning direction on said photosensitive medium;
    reading means for reading photoelectrically an original, said reading means including solid image sensing means comprising a plurality of small photoreceptive elements aligned in one row, said solid image sensing means reading the original line by line and converting the information carried on the original and represented by each line respectively into time series signals;
    memory means having a plurality of memory areas corresponding to each of said plurality of laser-radiating sources, each of said plurality of the memory areas being operative to memorize the information represented by different ones of the lines of the original read by said reading means; and
    control means for controlling each of said plurality of laser-radiating sources to radiate a laser beam in accordance with information memorized in a respective different one of said plurality of memory areas.

4. A laser recording system according to claim 3 further comprising:
    first clock generator means for controlling said solid image sensing means;
    second clock generator means for controlling the reading-out of the information from said memory means in order for said control means to control said laser-radiating sources, the clock cycle of said first clock generator means being different from the clock cycle of said second clock generator means.

* * * * *